3,145,090
METHOD OF MAKING BODY FROM GLASS PARTICLES

Dean A. Buckner, Perinton, and Harold C. Hafner, Webster, N.Y., assignors to Bausch & Lomb Incorporated, a corporation of New York
No Drawing. Filed Jan. 7, 1960, Ser. No. 940
1 Claim. (Cl. 65—18)

This invention relates to improved methods of making glass bodies and to articles made thereby.

While the practice of the invention has relatively wide application it is presently thought to be of particular advantage for making shaped bodies of relatively unstable glasses such as, for example, flint glass having a refractive index greater than 1.9, calcium oxide-aluminum oxide glass, and other glass compositions having special properties. Heretofore it has not been possible to obtain these properties in large bodies. Many of these glasses can only be made by quenching them so rapidly thta they shatter into relatively small fragments, since if it is attempted to cast them in relatively large body form or to anneal them, they devitrify rapidly.

Accordingly, one important object of the present invention is to provide improved methods of making shaped bodies of glass.

Other objects are: to provide improved methods of making shaped bodies of relatively high density glass compositions having relatively high refractive indices; to provide improved methods of making glass bodies having hitherto unobtainable characteristics; and to make possible the production of bodies of predetermined shape of glass compositions that have hitherto been regarded as unstable, and that cannot be made from a melt or by conventional molding techniques because of their tendency to devitrify when they are maintained at their working temperatures for periods long enough to mold them.

According to the invention, it has now been found that relatively dense, strong, and transparent glass bodies may be made by pressing a mass of pulverulent glass at a relatively low temperature at which its viscosity is above the generally recognized working range of the glass, and at a pressure sufficient to deform the individual particles of the mass so that the voids between them become closed. The presure is maintained for a time sufficient for the particles to deform and to flow together, and for the surfaces of the particles to become bonded together thereby forming a relatively dense, cohesive glass body.

The glasses with which the invention is concerned are those such as crown and flint glasses, that have softening points higher than 300° C. and flow points higher than about 400° C.

In general, the manipulative process steps may be similar to the steps of pressing fluoride salts as described in the co-pending application of Eugene C. Letter, Serial No. 821,040, filed June 17, 1959. Broadly, a mass of the pulverulent glass composition, which may be in the form of a powder or a frit is placed in a die, usually heated to an elevated temperature below the softening temperature of the glass, and then pressed with a pressure sufficient to deform the individual particles, to close the voids therebetween, and to achieve intimate surface contact between the particles so that the particles coalesce and become bonded together.

Similarly to the fluoride salt pressing process, the mold and its mating plunger are preferably arranged so that the spacing between the pressure surfaces is uniform in the pressure direction throughout the entire effective area of the mold. This design insures the application of uniform pressure throughout the entire body, and maximizes the uniformity of density and other characteristics of the body.

The pulverulent glass may be held in a ring, or other shaped perimeter defining device, or if desired an alternative technique may be used wherein lateral escape of the pressurized glass is minimized by a relatively close spacing of the perimetrical portions of the molding members to each other.

It has now been found that glass particles can be compacted by this process at relatively low temperatures to a uniform, dense mass, the individual particles being deformed to fill the voids normally present between them. Inter-action along the mating surfaces between the individual particles of the mass causes the particles to coalesce, and creates a strongly cohesive, or adhesive bond between the particles of a nature generally similar to the bond achieved in conventional sintering processes.

As hereinabove stated, in the usual case, the glass is heated both to facilitate its deformation and to accelerate the surface bonding reaction. During pressing, the particles become bonded together by what is presently thought to be a material transport-ion interchange type of bond, producing a uniform, cohesive body substantially without mosaic characteristics, without striae, and without bubbles.

The pressing temperature in the practice of the invention is always limited so that the viscosity of the glass during pressing is much higher than the viscosity at which the glass can be worked by conventional pressing, that is, much higher than about $10^6$ poises. Due to the fact that the pressure has a pronounced effect in increasing the viscosity, however, the pressing temperature may be higher than the recognized softening temperature of the glass at atmospheric pressure.

It is preferred, especially when pressing glasses that have a pronounced tendency to devitrify, not to heat the glass to a temperature higher than about 50° C. below its softening temperature in order to minimize stability problems. The softening temperature herein referred to is the temperature at which the viscosity of the glass is $10^{7.6}$ poises, as determined by the fiber elongation method described in ASTM Standard No. C338–57 (adopted in 1957).

Pressures in the range of about 1,000 to about 50,000 pounds per square inch have been found to provide satisfactory results, depending upon characteristics such as the plasticity of the glass, or glasses comprising the pulverulent mass being pressed, and also depending upon the operating temperature. For glasses having a relatively high degree of plasticity, relatively low pressures are required, and, conversely, for glasses having a relatively low plasticity at the operating temperature a relatively high pressure is needed.

There appears to be an inverse relationship between the required pressure and the operating temperature, with the upper values of both of these parameters being limited by the stability of the glass composition being pressed. It is preferred to operate at as high a temperature as possible, as limited by the devitrification tendencies of the glass, thereby permitting the use of a relatively low pressure. The pressure used must be adequate to densify the mass to a density close to the density of the individual particles composing the pressed body, thus minimizing voids in the body, which are undesirable because of their light scattering effect. The pressure should be sufficient to overcome the friction in the mass, both as between the particles thereof and internally in the individual particles in order to achieve plastic deformation in the compact, thereby closing up the voids between the particles and maximizing the surface contact between them.

An elevated temperature relatively close to the softening temperature is required for pressing silicate glasses and other relatively hard and non-ductile glass compositions while certain soft glass compositions may be pressed at temperatures relatively close to room temperature.

The particle size distribution of the pulverulent glass is relatively important in order to achieve optimum results. In order to avoid undesired entrapment of gas within the pressed body it is desired to have relatively large particles, which will permit the gas to escape from the compacted mass. In order to maximize the bulk density of the mass before pressing, thereby minimizing the degree of shrinkage during pressing, it is desired to fill up the voids between the relatively large, or coarse particles with relatively fine particles. Therefore, the optimum particle size distribution usually comprises a relatively high proportion of coarse particles and a relatively small proportion of fine particles. The fine particles also provide a relatively greater exposure of surface area for bonding purposes.

In the usual case it is preferred to preform the pulverulent mass into as dense and cohesive a body as is possible by compacting it by cold pressing, or by subjecting it to vibration, centrifuging, or the like before subjecting it to the hot pressing step.

Examples

I. A CaO—Al$_2$O$_3$ glass of the following composition, molar ratio basis:

| | |
|---|---|
| NaO$_{0.5}$, 7.5 | BaO, 2.0 |
| KO$_{0.5}$, 2.5 | TiO$_2$, 1.0 |
| CaO, 32.5 | ZrO$_2$, 1.0 |
| AlO$_{1.5}$, 57.5 | FeO$_{1.5}$, 2.0 |
| MgO, 2.0 | CuO$_{0.5}$, 0.25 | was made from a melt and pulverized to a particle size smaller than 60 mesh. A mass of the pulverulent glass so made was compacted to a disc shape about one-quarter inch thick by pressing at room temperature at 10,000 p.s.i. to form a loosely cohesive body. The body so formed was placed on a plate within a steel ring, which fitted relatively closely around its circumference, and heated to about 725° C. While it was maintained at this temperature the body was pressed in a direction perpendicular to its diameter at about 35,000 pounds per square inch of surface area for about 15 minutes, and then removed from the press and cooled by exposure to the atmosphere. The pressed body was then removed from the ring by core drilling. The resulting body was a relatively dense, compact, and cohesive glass body without striae, inclusions, or bubbles.

II. A glass made from a melt having a batch composition, by weight, of 85% PbO and 15% SiO$_2$, was pulverized to a particle size of less than 60 mesh. A mass of the pulverulent glass was then preformed by pressing in a steel ring die on an anvil at room temperature at about 10,000 p.s.i. to form a loosely cohesive disc-shaped body. This body, in the die was then heated to about 700° C. for a time sufficient to establish equilibrium temperature conditions throughout its mass (about 15 minutes "soak" after reaching the desired temperature) and then pressed in the direction of its major axis for about 15 minutes at a pressure of about 30,000 p.s.i. of effective surface area. After pressing, the body was removed from the press, allowed to cool by exposure to the atmosphere, and then removed from the ring by core drilling. The pressed body was relatively clear, strongly cohesive, and free from structural imperfections.

What is claimed is:

A method of making a shaped body of a compacted mass of particles composed of a relatively unstable glass composition comprising pulverizing the glass to a particle size having a relatively high proportion of coarse particles which are smaller than 60 mesh and a relatively small proportion of fine particles, forming the pulverulent mass into a loosely cohesive body by pressing at about 10,000 pounds per square inch, heating the loosely cohesive body to a temperature of about 725° C., maintaining the body at about 35,000 pounds per square inch of sectional area of the mass in a plane perpendicular to the direction of pressure for about 15 minutes, thereby to close the voids between the particles of said mass by deformation of said particles and to bond the particles together into a cohesive, dense body.

References Cited in the file of this patent

UNITED STATES PATENTS

| 2,215,214 | Galey | Sept. 17, 1940 |
| 2,247,270 | Bair | June 24, 1941 |
| 2,865,139 | Anderson | Dec. 23, 1958 |

FOREIGN PATENTS

| 179,408 | Japan | June 27, 1948 |
| 578,580 | Great Britain | July 3, 1946 |
| 749,924 | Great Britain | June 6, 1956 |